(No Model.)

W. H. PENFIELD.
COASTING SLED.

No. 362,177. Patented May 3, 1887.

WITNESSES
E. A. Newman
C. M. Newman

INVENTOR
William H. Penfield,
By his Attorneys
Baldwin Hopkins & Payton.

UNITED STATES PATENT OFFICE.

WILLIAM HENRY PENFIELD, OF PELHAMVILLE, NEW YORK.

COASTING-SLED.

SPECIFICATION forming part of Letters Patent No. 362,177, dated May 3, 1887.

Application filed March 25, 1887. Serial No. 232,432. (No model.)

*To all whom it may concern:*

Be it known that I, WILLIAM HENRY PENFIELD, of Pelhamville, in the county of Westchester and State of New York, have invented certain new and useful Improvements in Coasting-Sleds for Sliding Downhill, of which the following is a specification.

My invention relates particularly to guiding and braking mechanism.

Figure 1:
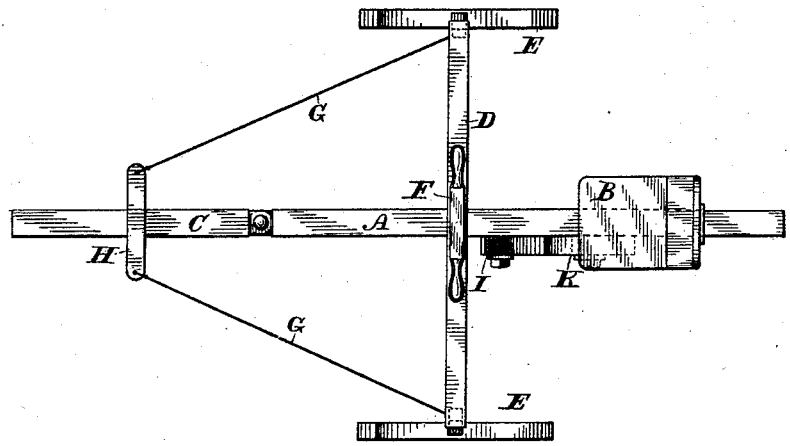
Figure 2:
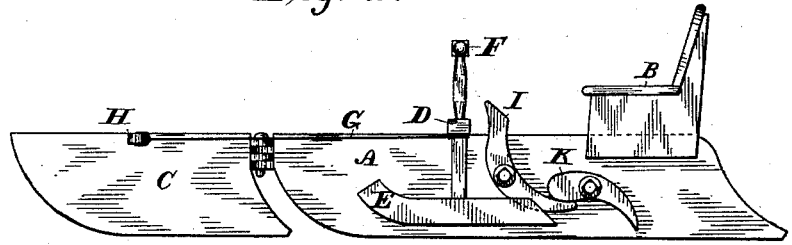
Figure 3:
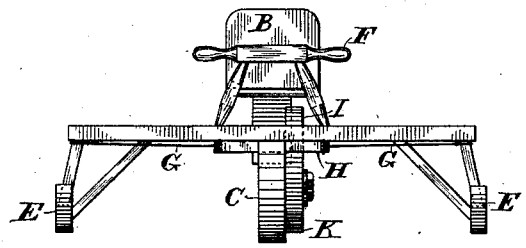

In the accompanying drawings, illustrating my invention, Figure 1 is a plan view; Fig. 2, a side view, and Fig. 3 a front end view.

A indicates the main runner, located in the center of the sled and provided with a seat, B, capable of accommodating one or it might be several persons.

C indicates a front guide runner or rudder, pivoted to the main runner A, as shown.

D indicates a bar pivoted at its center on top of the main runner, having light guide-runners or stay-runners E E secured to it at each end, and a handle, F.

G G indicate wires or cords connecting with the front guide-runner, or with a piece or block, H, attached to it.

I indicates a pivoted foot-lever, and K a pivoted brake, so arranged that pressure upon the foot-lever with the foot will force the brake down upon the sliding surface and stop the sled. By means of the front guide-runner acting like a front rudder and the mechanism for turning it to the right or left, the sled can be perfectly guided, and it is prevented from tipping over by the light runners E E on either side. These runners also act, in conjunction with the front guide-runner, to aid in turning or guiding the sled in its course.

Such a sled can be made very light and cheap for a single person, and is perfectly controllable, both as to its speed and direction, by the brake mechanism and the guiding mechanism above described.

I am aware that sleds have been constructed some with front and others with rear guide-runners, and I do not broadly claim such devices.

What I claim to be new, and desire to secure by Letters Patent of the United States, is—

1. An improved coasting-sled, composed of a single main runner, in combination with a guide-runner pivoted directly to its front end, the bar D, pivoted on top of the main runner and provided with light stay-runners E E, the wires or cords G G, and a handle, F, for guiding the sled and preventing it from tipping over, all substantially as set forth.

2. In combination with the main central runner and the guide-runner pivoted directly to its front end, the seat, the guiding and staying mechanism, as described, adapted to be operated by hand, and the brake mechanism, as described, adapted to be simultaneously operated by the foot, substantially as set forth.

In testimony whereof I have hereunto subscribed my name.

WILLIAM HENRY PENFIELD.

Witnesses:
 STEPHEN J. STILWELL,
 JARED SANDFORD.